No. 703,251. Patented June 24, 1902.
J. A. HAIRE.
PIPE PULLER.
(Application filed Apr. 14, 1902.)
(No Model.)

WITNESSES:

INVENTOR
James A. Haire
BY
ATTORNEYS.

UNITED STATES PATENT OFFICE.

JAMES A. HAIRE, OF WEYAUWEGA, WISCONSIN.

PIPE-PULLER.

SPECIFICATION forming part of Letters Patent No. 703,251, dated June 24, 1902.

Application filed April 14, 1902. Serial No. 102,726. (No model.)

*To all whom it may concern:*

Be it known that I, JAMES A. HAIRE, a citizen of the United States, and a resident of Weyauwega, in the county of Waupaca and State of Wisconsin, have invented a new and Improved Pipe-Puller, of which the following is a full, clear, and exact description.

My invention relates to an improvement in devices for drawing pipe out from a well or other structure; and the purpose of the invention is to provide a portable device so constructed that power may be taken from a driving belt or chain and communicated to lifting-screws with the least possible amount of machinery and also to provide a construction whereby the device will pull straight and obviate any tendency to torsion or wind in the cross-head.

The invention consists in the novel construction and combination of the several parts, as will be hereinafter fully set forth and pointed out in the claims.

Reference is to be had to the accompanying drawings, forming a part of this specification, in which similar characters of reference indicate corresponding parts in all the figures.

Figure 1:
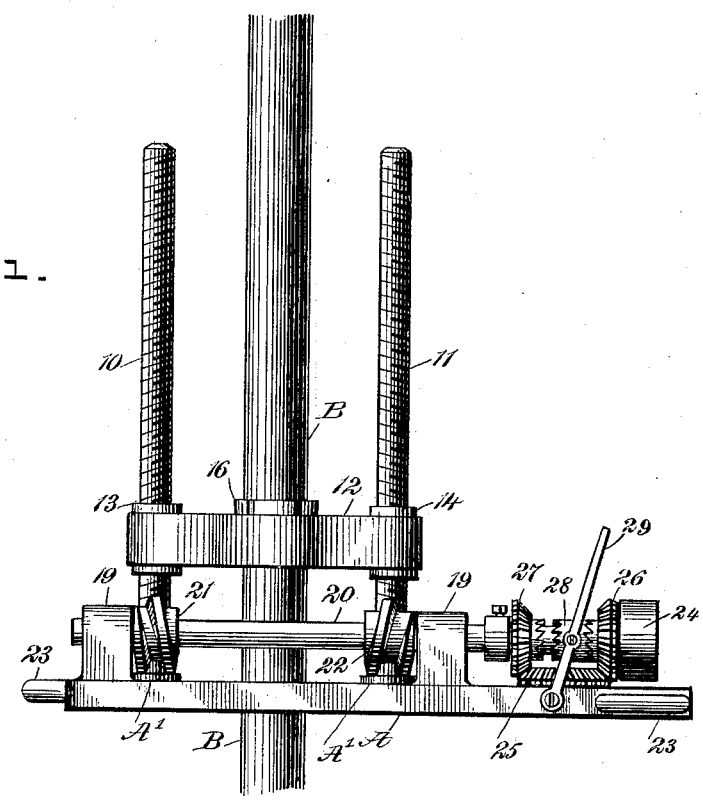
Figure 2:
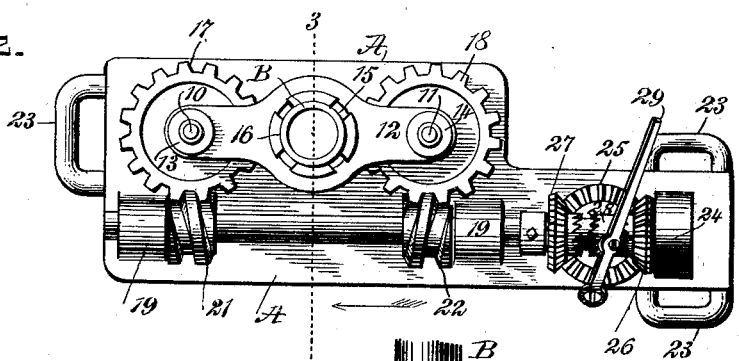
Figure 3:
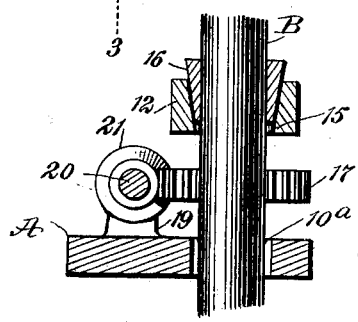

Figure 1 is a side elevation of the device. Fig. 2 is a plan view of the same, and Fig. 3 is a transverse vertical section taken practically on the line 3 3 of Fig. 2.

A represents a flat base, which may be of any suitable dimensions, and in stepped boxes A', formed upon the base, two parallel upright screws 10 and 11 are mounted to turn, the screw 10 having a right-hand thread and the screw 11 a left-hand thread. These screws are connected by a cross-head 12, provided with nuts 13 and 14 in its ends, the nut 13 having a right-hand thread to travel upon the right-hand-threaded screw 10, while the nut 14 is threaded to travel upon the left-hand-threaded screw 11. An opening 10ᵃ is made in the base A, through which the pipe B to be operated upon passes, and said pipe also passes through a central tapering opening 15 in the cross-head, and the pipe is secured to the cross-head by wedges 16, driven into the opening 15 around the pipe. At the lower end of the right-hand-threaded screw 10 a right-hand worm-wheel 17 is fastened, and a left-hand worm-wheel 18 is similarly secured to the left-hand-threaded screw 11. In front of the screws 10 and 11 boxes 19 are located upon the base A, supporting a drive-shaft 20, which shaft is provided with a pulley 24 at one end and carries two worms 21 and 22, the worm 21 being right-hand and meshes with the right-hand worm-gear 17, while the worm 22 is left-hand and meshes with the left-hand worm-gear 18. Handles 23 are secured to the base, enabling it to be readily moved from place to place. The object of the right and left hand threaded screws is to render the pull straight and to obviate any tendency to torsion or wind in the cross-head, while the right and left hand worm-gears balance the end thrust of the drive-shaft, making a pipe-puller that is light in weight, compact and very durable, and which will easily do the required work.

When the pipe-puller is used with a horse-power or engine that cannot reverse the motion, I employ a reversing mechanism (shown in Figs. 1 and 2) consisting of a large bevel-gear 25, mounted to revolve upon the base, and two meshing bevel-pinions 26 and 27, loosely mounted upon the drive-shaft 20 and having inner clutch-faces, both adapted for engagement with the face of a double clutch 28, mounted to slide on a feather of the shaft 20 and operated through the medium of the usual shifting-lever 29, which is fulcrumed on the base, whereby to turn the screws 10 and 11 in a direction to carry the cross-head 12 upward or reverse the motion of the screws to bring the cross-head back to its starting-point.

Having thus described my invention, I claim as new and desire to secure by Letters Patent—

1. In a pipe-puller, a support, right and left hand threaded screws mounted to revolve upon the said support, a cross-head having a central opening for a pipe, nuts carried at the ends of the cross-head and threaded correspondingly to the threads of the screws, one of the nuts being adapted to travel upon each of the said screws, right and left hand worm-wheels secured upon correspondingly-threaded screws, a drive-shaft, and right and left hand worms on the drive-shaft, adapted to engage one with the right-hand worm-wheel and the other with the left-hand worm-wheel, as described.

2. In a pipe-puller, a support, right and left hand threaded screws mounted to revolve upon the said support, a cross-head having a central opening for a pipe, nuts carried at the ends of the cross-head and threaded correspondingly to the threads of the screws, one of the nuts being adapted to travel upon each of said screws, right and left hand worm-wheels secured upon correspondingly-threaded screws, a drive-shaft, and right and left hand worms on the drive-shaft, adapted to engage one with the right-hand worm-wheel and the other with the left-hand worm-wheel, a reversing mechanism mounted to revolve upon the support, pinions meshing with the gear and loosely mounted on the shaft, said pinions being provided with clutch-faces, and a clutch mounted to slide on and turn with the shaft between the clutch-faces of the pinions, and means for shifting the said clutch, as described.

In testimony whereof I have signed my name to this specification in the presence of two subscribing witnesses.

JAMES A. HAIRE.

Witnesses:
F. S. WOODWORTH,
THOMAS F. WILSON.